US012584469B2

(12) United States Patent
Poehls et al.

(10) Patent No.: US 12,584,469 B2
(45) Date of Patent: Mar. 24, 2026

(54) VALVE CARTRIDGE ASSEMBLY FOR A FLUID PUMP

(71) Applicant: SPM Oil & Gas Inc., Fort Worth, TX (US)

(72) Inventors: Justin Poehls, Glen Rose, TX (US); David T. Figgs, Fort Worth, TX (US); Nuder Said, Fort Worth, TX (US); Chiawei Steven Su, Arlington, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 18/808,449

(22) Filed: Aug. 19, 2024

(65) Prior Publication Data

US 2026/0049603 A1 Feb. 19, 2026

(51) Int. Cl.
| | |
|---|---|
| *F04B 7/02* | (2006.01) |
| *F04B 9/02* | (2006.01) |
| *F04B 39/14* | (2006.01) |
| *F04B 53/10* | (2006.01) |
| *F16K 15/06* | (2006.01) |

(52) U.S. Cl.
CPC .................. *F04B 7/02* (2013.01); *F04B 9/02* (2013.01); *F04B 39/14* (2013.01); *F04B 53/109* (2013.01); *F16K 15/066* (2013.01); *F16K 2200/501* (2021.08); *F16K 2200/502* (2021.08)

(58) Field of Classification Search
CPC .. F04B 7/02; F04B 7/04; F04B 53/102; F04B 53/109; F04B 53/22; F04B 9/02; F04B 23/06; F04B 39/14; E21B 43/2607; F16K 15/026; F16K 15/063; F16K 15/066; F16K 2200/501; F16K 2200/502
See application file for complete search history.

(56) References Cited

U.S. PATENT DOCUMENTS

| | | | |
|---|---|---|---|
| 5,253,987 | A | 10/1993 | Harrison |
| 5,636,975 | A | 6/1997 | Tiffany et al. |
| 6,231,323 | B1 | 5/2001 | Jezek |
| 10,323,634 | B2 | 6/2019 | Huang |
| 11,867,171 | B2 | 1/2024 | Li et al. |

(Continued)

FOREIGN PATENT DOCUMENTS

| | | |
|---|---|---|
| CN | 106481528 A | 3/2017 |
| CN | 220929653 U | 5/2024 |

*Primary Examiner* — Loren C Edwards

(57) ABSTRACT

A valve cartridge assembly may include a valve cartridge housing defining a suction chamber that is open at a first end of the valve cartridge housing and one or more first passageways through the valve cartridge housing that lead into the suction chamber, and a discharge chamber that is open at a second end of the valve cartridge housing and one or more second passageways through the valve cartridge housing that lead into the discharge chamber. The discharge chamber may be fluidly isolated from the suction chamber through the valve cartridge housing. The valve cartridge assembly may include a suction valve assembly, including a suction valve that seals the suction chamber, that is configured to control flow through the suction chamber. The valve cartridge assembly may include a discharge valve assembly, including a discharge valve that seals the discharge chamber, that is configured to control flow through the discharge chamber.

20 Claims, 4 Drawing Sheets

(56)                    References Cited

U.S. PATENT DOCUMENTS

| 2003/0235509 | A1  |     | 12/2003 | Maki |
| 2016/0177943 | A1* |     | 6/2016  | Pacht ................... F04B 53/007 |
|              |     |     |         | 137/565.01 |
| 2020/0011317 | A1  |     | 1/2020  | Haas et al. |

* cited by examiner

VALVE CARTRIDGE ASSEMBLY FOR A FLUID PUMP

TECHNICAL FIELD

The present disclosure relates generally to fluid pumps and, for example, to a valve cartridge assembly for a fluid pump.

BACKGROUND

Hydraulic fracturing is a well stimulation technique that typically involves pumping hydraulic fracturing fluid into a wellbore at a rate and a pressure (e.g., up to 15,000 pounds per square inch (psi)) sufficient to form fractures in a rock formation surrounding the wellbore. This well stimulation technique often enhances the natural fracturing of a rock formation to increase the permeability of the rock formation, thereby improving recovery of water, oil, natural gas, and/or other fluids.

A hydraulic fracturing system may employ one or more fluid pumps for pressurizing hydraulic fracturing fluid. A fluid pump has a suction side, at which low-pressure fluid enters the fluid pump via a suction valve assembly to be pressurized, and a discharge side at which high-pressure fluid pressurized by the fluid pump exits the fluid pump via a discharge valve assembly. A valve assembly may include various components, such as a valve, a valve seat, a spring, a spring retainer, or the like. Each of these components is subject to wear and/or failure, and therefore may be serviced (e.g., reconditioned, repaired, or replaced) from time to time (e.g., about every 100 hours). For example, for servicing, the suction and discharge valve assemblies of the fluid pump may be disassembled and removed from the fluid pump, sometimes using specialized equipment, and then reassembled in the fluid pump following servicing. Accordingly, servicing the suction and discharge valve assemblies of the fluid pump is time consuming and inefficient.

The valve cartridge assembly of the present disclosure solves one or more of the problems set forth above and/or other problems in the art.

SUMMARY

A fluid end of a fluid pump may include a fluid end block with a bore in which a plunger is to reciprocate. The fluid end may include a valve cartridge, disposed in the bore and configured for insertion into and removal from the bore as a unit. The valve cartridge may include a valve cartridge housing defining a suction chamber that is open at a first end of the valve cartridge housing and one or more first passageways through the valve cartridge housing that lead into the suction chamber, and a discharge chamber that is open at a second end of the valve cartridge housing, and one or more second passageways through the valve cartridge housing that lead into the discharge chamber. The valve cartridge may include a suction valve assembly including a suction valve that seals the suction chamber, where the suction valve assembly is configured to control flow through the suction chamber. The valve cartridge may include a discharge valve assembly including a discharge valve that seals the discharge chamber, where the discharge valve assembly is configured to control flow through the discharge chamber. The fluid end may include a valve cartridge sleeve, disposed in the bore around the valve cartridge housing, that fluidly connects the suction chamber and the discharge chamber.

A valve cartridge assembly may include a valve cartridge housing defining a suction chamber that is open at a first end of the valve cartridge housing and one or more first passageways through the valve cartridge housing that lead into the suction chamber, and a discharge chamber that is open at a second end of the valve cartridge housing and one or more second passageways through the valve cartridge housing that lead into the discharge chamber. The discharge chamber may be fluidly isolated from the suction chamber through the valve cartridge housing. The valve cartridge assembly may include a suction valve assembly including a suction valve that seals the suction chamber, where the suction valve assembly is configured to control flow through the suction chamber. The valve cartridge assembly may include a discharge valve assembly including a discharge valve that seals the discharge chamber, where the discharge valve assembly is configured to control flow through the discharge chamber.

A fluid pump may include a power end, and a fluid end, coupled to the power end. The fluid end may include a fluid end block with a bore, and a plunger configured to reciprocate with respect to the bore. The fluid end may include a valve cartridge, configured for insertion into and removal from the bore as a unit. The valve cartridge may include a valve cartridge housing defining a suction chamber that is open at a first end of the valve cartridge housing and one or more first passageways through the valve cartridge housing that lead into the suction chamber, and a discharge chamber that is open at a second end of the valve cartridge housing and one or more second passageways through the valve cartridge housing that lead into the discharge chamber. The valve cartridge may include a suction valve assembly including a suction valve that seals the suction chamber, where the suction valve assembly is configured to control flow through the suction chamber. The valve cartridge may include a discharge valve assembly including a discharge valve that seals the discharge chamber, where the discharge valve assembly is configured to control flow through the discharge chamber.

DETAILED DESCRIPTION

This disclosure relates to a valve cartridge, which is applicable to any positive displacement fluid pump.

Figure 1:
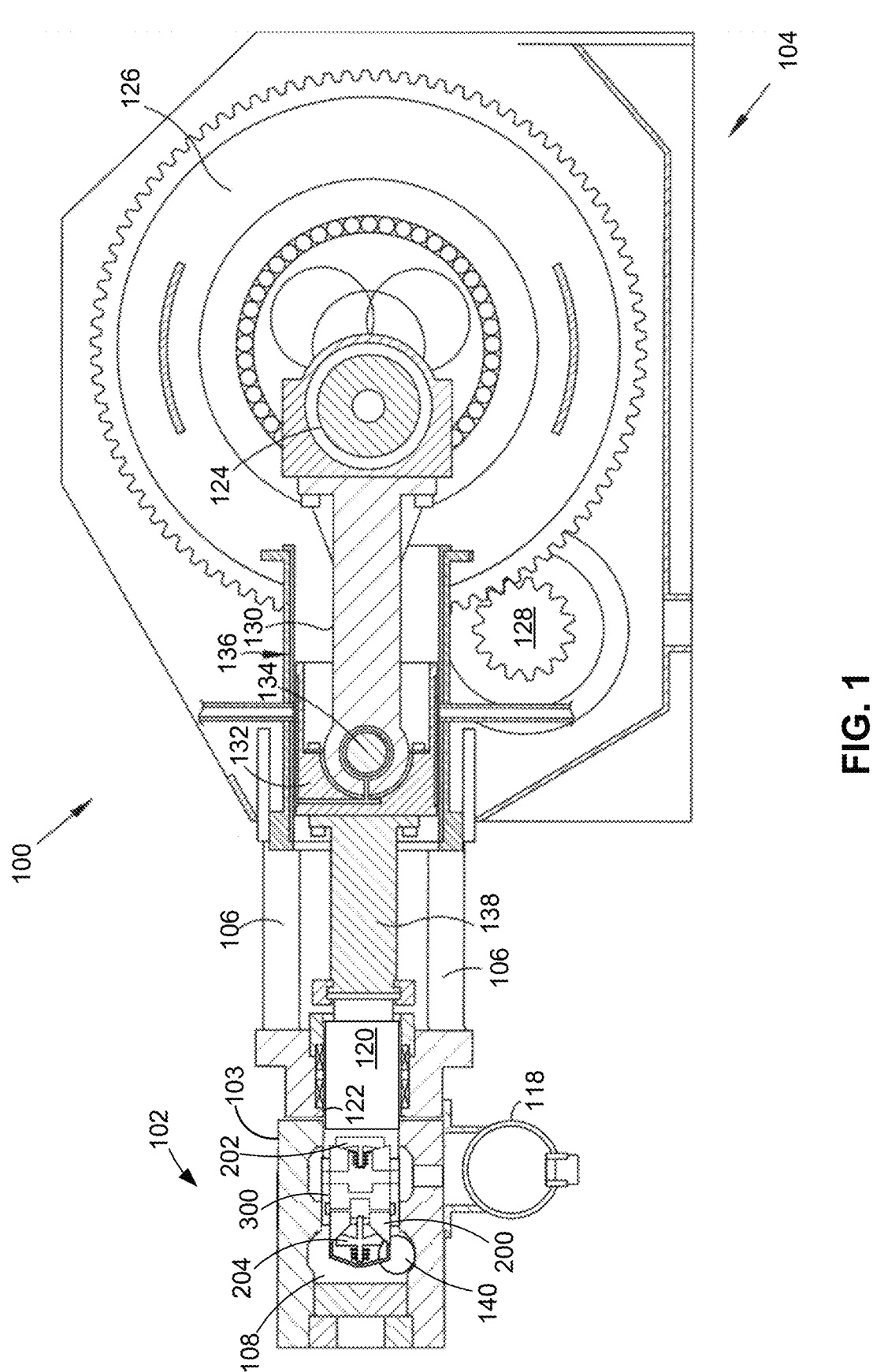
FIG. 1 is a cross-sectional view of an example fluid pump.

FIG. 1 is a cross-sectional view of an example fluid pump 100. The fluid pump 100 includes a fluid end 102 and a power end 104. The fluid end 102 may be connected to the power end 104 by stay rods 106. The fluid end 102 includes a fluid end block 103 having one or more bores 108 (only one shown). For example, the fluid pump 100 may include one, two, three, four, five, or more bores 108. In some implementations, the fluid pump 100 may be mounted on a trailer to facilitate transportation of the fluid pump 100 between operational sites. In some implementations, the fluid pump 100 may be a hydraulic fracturing pump. For example, the fluid pump 100 may have a capability to produce a discharge pressure of at least 8,000 psi, at least 10,000 psi, at least 12,000 psi, or at least 15,000 psi.

The bore 108 is a passageway through the fluid end block 103 of the fluid end 102. The fluid end 102 may include a valve cartridge 200 disposed in the bore 108 (e.g., a respective valve cartridge 200 may be disposed in each bore 108 of the fluid end 102). For example, the valve cartridge 200 is configured for insertion into, and removal from, the bore 108 as a unit. The valve cartridge 200 includes a suction valve assembly 202 and a discharge valve assembly 204. The suction valve 202 and the discharge valve 204 may have different configurations from that depicted in FIG. 1. The bore 108 may be contoured such that when the valve cartridge 200 is disposed in the bore 108, the valve cartridge 200 partitions the bore 108 into multiple fluidly isolated chambers. The valve cartridge 200 may be fluidly connected to a suction manifold 118, and to a discharge manifold 140.

In operation, fluid is pressurized to a low pressure (e.g., 80 psi) by an outside system (e.g., a centrifugal pump) and pushed through the suction manifold 118 and through the suction valve assembly 202. The fluid is then pumped in response to a forward stroke of a plunger 120 and flows through the discharge valve assembly 204.

In operation, the plunger 120 moves in a plunger bore 122 and is driven by the power end 104 of the fluid pump 100. The power end 104 includes a crankshaft 124 that is rotated by a gearbox output 126, which is illustrated by a single gear but may be more than one gear. A gearbox input 128 is coupled to a transmission (not shown) and/or a prime mover (not shown), such as a diesel engine, to rotate the gearbox input 128 during operation. A connecting rod 130 mechanically connects the crankshaft 124 to a crosshead 132 via a wrist pin 134. The crosshead 132 is mounted within a stationary crosshead housing 136, which constrains the crosshead 132 to linear reciprocating movement. A pony rod 138 connects to the crosshead 132 and has its opposite end connected to the plunger 120 to enable reciprocating movement of the plunger 120.

In operation, movement of the crankshaft 124 causes the plunger 120 to reciprocate with respect to the bore 108 (e.g., to reciprocate toward and away from the bore 108). As the plunger 120 translates away from the bore 108 (a suction stroke of the plunger 120), the pressure of the fluid on an external side of the suction valve assembly 202 decreases, which creates a pressure differential across the suction valve assembly 202. The pressure differential across the suction valve assembly 202 enables actuation of a valve of the suction valve assembly 202 to allow the fluid to enter the valve cartridge 200 from the suction manifold 118 (e.g., the valve may open responsive to the pressure differential). The pumped fluid is pushed into the valve cartridge 200 as the plunger 120 continues to translate away from the bore 108. As the plunger 120 changes directions and moves toward the bore 108 (a discharge stroke of the plunger 120), the fluid pressure inside the valve cartridge 200 increases, which creates a pressure differential across the discharge valve assembly 204. Fluid pressure inside the valve cartridge 200 continues to increase as the plunger 120 approaches the bore 108 until the pressure differential across the discharge valve assembly 204 is great enough to actuate a valve of the discharge valve assembly 204 and enable the fluid to exit the valve cartridge 200 (e.g., the valve may open responsive to the pressure differential).

The fluid end 102 may also include a valve cartridge sleeve 300 disposed in the bore 108 around the valve cartridge 200 (e.g., a respective valve cartridge sleeve 300 may be disposed in each bore 108 of the fluid end 102). For example, the valve cartridge sleeve 300 is configured for insertion into and removal from the bore 108 as a unit (e.g., as a unit with the valve cartridge 200 or separately from the valve cartridge 200). The valve cartridge sleeve 300 provides passageways that facilitate fluid flow through the bore 108, outside of the valve cartridge 200, between otherwise isolated chambers of the valve cartridge 200. In this way, wear caused by high applied pressures in the fluid end 102 is experienced by the valve cartridge sleeve 300 rather than the fluid end block 103.

As indicated above, FIG. 1 is provided as an example. Other examples may differ from what is described with regard to FIG. 1.

Figure 2:
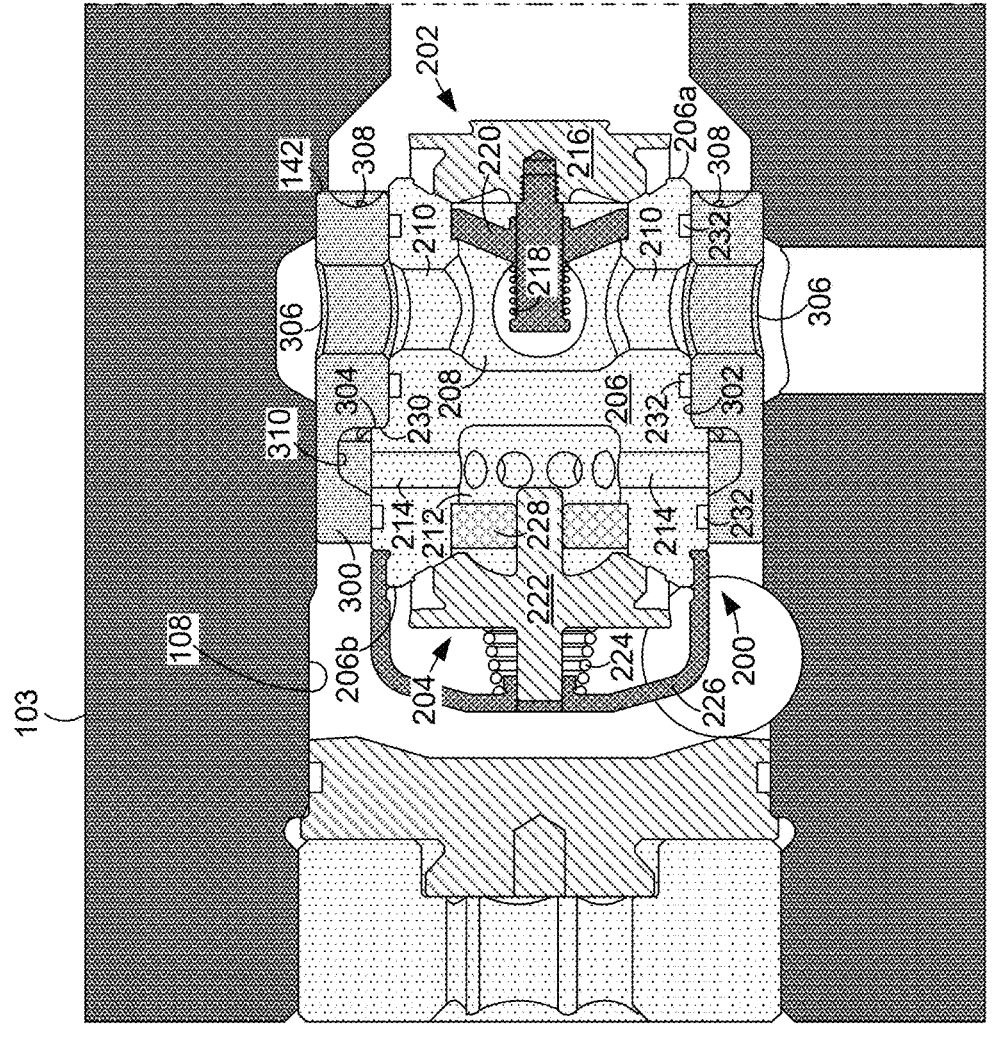
FIG. 2 is a detailed cross-sectional view of an example fluid end.

FIG. 2 is a detailed cross-sectional view of an example of the fluid end 102. As shown, the valve cartridge 200 and the valve cartridge sleeve 300 are disposed in the bore 108 through the fluid end block 103. Together, the valve cartridge 200 and the valve cartridge sleeve 300 may form a valve cartridge assembly. The valve cartridge 200 may be arranged in the bore 108 co-axially with the plunger 120 (as shown in FIG. 1). The valve cartridge 200 may be disposed in the bore 108 in an orientation in which the suction valve assembly 202 is nearer to the plunger 120, and the discharge valve assembly 204 is farther from the plunger 120 (as shown in FIG. 1).

The valve cartridge 200 includes a valve cartridge housing 206. The valve cartridge housing 206 may define a suction chamber 208 that is open at a first end 206a of the valve cartridge housing 206. For example, the first end 206a of the valve cartridge housing 206 is open (e.g., unenclosed) and leads into the suction chamber 208, which is a hollow internal region of the valve cartridge housing 206. Moreover, one or more passageways 210 (sometimes referred to herein as "first passageways") are defined through the valve cartridge housing 206 and lead into (e.g., open into) the suction chamber 208. For example, multiple passageways 210 may be arranged radially around the valve cartridge housing 206. The passageways 210 may fluidly connect the suction chamber 208 and the bore 108.

The valve cartridge housing 206 may also define a discharge chamber 212 that is open at a second end 206b of the valve cartridge housing 206. For example, the second end 206b of the valve cartridge housing 206 is open (e.g., unenclosed) and leads into the discharge chamber 212, which is a hollow internal region of the valve cartridge housing 206. Moreover, one or more passageways 214 (sometimes referred to herein as "second passageways") are defined through the valve cartridge housing 206 and lead into (e.g., open into) the discharge chamber 212. For example, multiple passageways 214 may be arranged radially around the valve cartridge housing 206. The passageways 214 may fluidly connect the discharge chamber 212 and the bore 108. The discharge chamber 212 may be fluidly isolated from the suction chamber 208 through the valve cartridge housing 206. For example, there may be no passageways within or through the valve cartridge housing 206 that fluidly connect the suction chamber 208 and the discharge chamber 212.

The suction valve assembly 202 is configured to control flow through the suction chamber 208. The suction valve assembly 202 may include a suction valve 216, a biasing element 218 (e.g., one or more springs, one or more elastomeric bands, or the like), and a valve guide 220. The suction valve 216 may seal the suction chamber 208 at the first end 206a of the valve cartridge housing 206. For example, in a closed position, the suction valve 216 encloses the open end of the suction chamber 208. The valve guide 220 may engage a stem of the suction valve 216 to guide actuation of the suction valve 216 in a linear manner. The valve guide 220 has openings or other discontinuities that allow fluid to flow through the valve guide 220. The biasing element 218, which may be held by the valve guide 220 (e.g., the valve guide 220 also acts as a retainer for the biasing element 218), is configured to bias the suction valve 216 to the closed position.

The discharge valve assembly 204 is configured to control flow through the discharge chamber 212. The discharge valve assembly 204 may include a discharge valve 222, a biasing element 224 (e.g., one or more springs, one or more elastomeric bands, or the like), a retainer 226, and a valve guide 228. The discharge valve 222 may seal the discharge chamber 212 at the second end 206b of the valve cartridge housing 206. For example, in a closed position, the discharge valve 222 encloses the open end of the discharge chamber 212. The biasing element 224, held by the retainer 226, is configured to bias the discharge valve 222 to the closed position. The valve guide 228 may engage a stem of the discharge valve 222 to guide actuation of the discharge valve 222 in a linear manner. The valve guide 228 has openings or other discontinuities that allow fluid to flow through the valve guide 228.

The suction valve assembly 202 and the discharge valve assembly 204 may be arranged in the valve cartridge housing 206 in a back-to-back configuration, such that the suction valve assembly 202 and the discharge valve assembly 204 open in opposite directions. For example, the suction valve assembly 202 may be configured to open the suction valve 216 in a first direction along the bore 108 (e.g., away from the valve cartridge housing 206), and the discharge valve assembly 204 may be configured to open the discharge valve 222 in a second direction along the bore 108 (e.g., away from the valve cartridge housing 206) opposite the first direction. As an example, the suction valve assembly 202 may be configured to open the suction valve 216 toward the plunger 120, and the discharge valve assembly 204 may be configured to open the discharge valve 222 away from the plunger 120.

The valve cartridge sleeve 300 is an annular casing that defines an interior cavity 302 extending a length of the valve cartridge sleeve 300. The valve cartridge sleeve 300 is arranged around the valve cartridge housing 206 (e.g., the valve cartridge housing 206 is received in the interior cavity 302 of the valve cartridge sleeve 300). For example, the valve cartridge housing 206 may be interference fit within the valve cartridge sleeve 300. Moreover, the valve cartridge sleeve 300 may be interference fit within the bore 108. In some implementations, the valve cartridge housing 206 and the valve cartridge sleeve 300 may have opposing stops 230, 304 that restrict relative sliding and properly align the valve cartridge housing 206 and valve cartridge sleeve 300. Similarly, the bore 108 may have a stop 142 that further restricts relative sliding of the valve cartridge housing 206 and the valve cartridge sleeve 300, and that defines a maximum insertion depth of the valve cartridge sleeve 300 into the bore 108.

The valve cartridge sleeve 300 has one or more openings 306 that extend through the valve cartridge sleeve 300 to the interior cavity 302 of the valve cartridge sleeve 300. For example, multiple openings 306 may be arranged radially around the valve cartridge sleeve 300. When the valve cartridge sleeve 300 is arranged around the valve cartridge housing 206, the openings 306 align with the first passageways 210 through the valve cartridge housing 206, thereby fluidly connecting the suction chamber 208 to the suction manifold 118 via the valve cartridge sleeve 300.

In addition, the valve cartridge sleeve 300 has one or more passageways 308 that extend longitudinally within the valve cartridge sleeve 300. For example, the passageways 308 may extend within the valve cartridge sleeve 300 parallel to the interior cavity 302 of the valve cartridge sleeve 300. The passageways 308 may be transverse to the openings 306. Accordingly, the passageways 308 and the openings 306 are non-intersecting. The passageways 308 may lead to the inner circumferential groove 310 in the valve cartridge sleeve 300. When the valve cartridge sleeve 300 is arranged around the valve cartridge housing 206, the inner circumferential groove 310 aligns with the second passageways 214 through the valve cartridge housing 206, thereby fluidly connecting the discharge chamber 212 to the bore 108 via the valve cartridge sleeve 300.

The valve cartridge housing 206 may include multiple sealing rings 232 to provide fluid-tight interfaces between the valve cartridge housing 206 and the valve cartridge sleeve 300. The sealing rings 232 may be arranged in the valve cartridge housing 206 on opposite sides of the first passageways 210 (e.g., the first passageways 210 are between a pair of sealing rings 232), and to contact the inner surface of the valve cartridge sleeve 300 on opposite sides of the openings 306 (e.g., the openings are between a pair of sealing rings 232). Additionally, the sealing rings 232 may be arranged in the valve cartridge housing 206 on opposite sides of the second passageways 214 (e.g., the second passageways 214 are between a pair of sealing rings 232), and to contact the inner surface of the valve cartridge sleeve 300 on opposite sides of the inner circumferential groove 310 (e.g., the inner circumferential groove 310 is between a pair of sealing rings 232). Additionally, or alternatively, the valve cartridge sleeve 300 may include the sealing rings 232 at corresponding locations in the valve cartridge sleeve 300.

During a suction stroke of the plunger 120, the suction valve assembly 202 is configured to open the suction valve 216, thereby causing fluid to flow from the suction manifold 118 through the suction chamber 208 (e.g., via the openings 306 in the valve cartridge sleeve 300 and the first passageways 210) and into a suction side (e.g., a plunger side) of the bore 108. During a discharge stroke of the plunger 120, the suction valve assembly 202 is configured to close the suction valve 216 (sealing the suction chamber 208), and fluid is pumped from the bore 108 into the discharge chamber 212 via the valve cartridge sleeve 300 (e.g., through the passageways 308 of the valve cartridge sleeve 300 and the second passageways 214). As fluid pressure inside the discharge chamber 212 increases, during the discharge stroke of the plunger 120, the discharge valve assembly 204 is configured to open the discharge valve 222, thereby causing fluid to flow through the discharge chamber 212 into a discharge side of the bore 108 and to the discharge manifold 140.

As indicated above, FIG. 2 is provided as an example. Other examples may differ from what is described with regard to FIG. 2.

Figure 3:
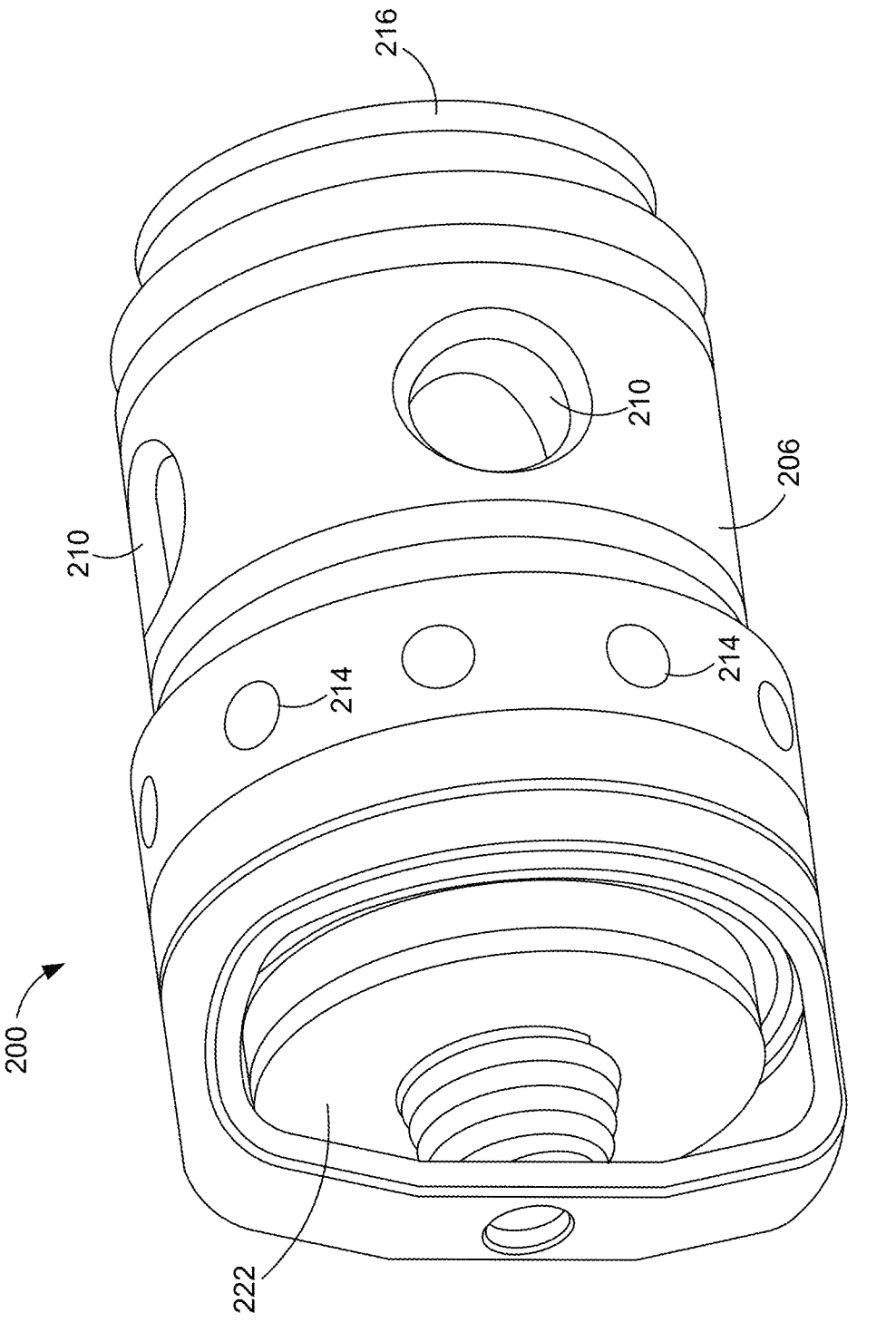
FIG. 3 is a perspective view of an example valve cartridge.

FIG. 3 is a perspective view of an example of the valve cartridge 200. FIG. 3 shows the radial arrangement of the first passageways 210 around the valve cartridge housing 206, and the radial arrangement of the second passageways 214 around the valve cartridge housing 206. As further shown, the suction valve 216 and the discharge valve 222 are located at opposite ends of the valve cartridge housing 206, and open away from a center of the valve cartridge housing 206.

As indicated above, FIG. 3 is provided as an example. Other examples may differ from what is described with regard to FIG. 3.

Figure 4:
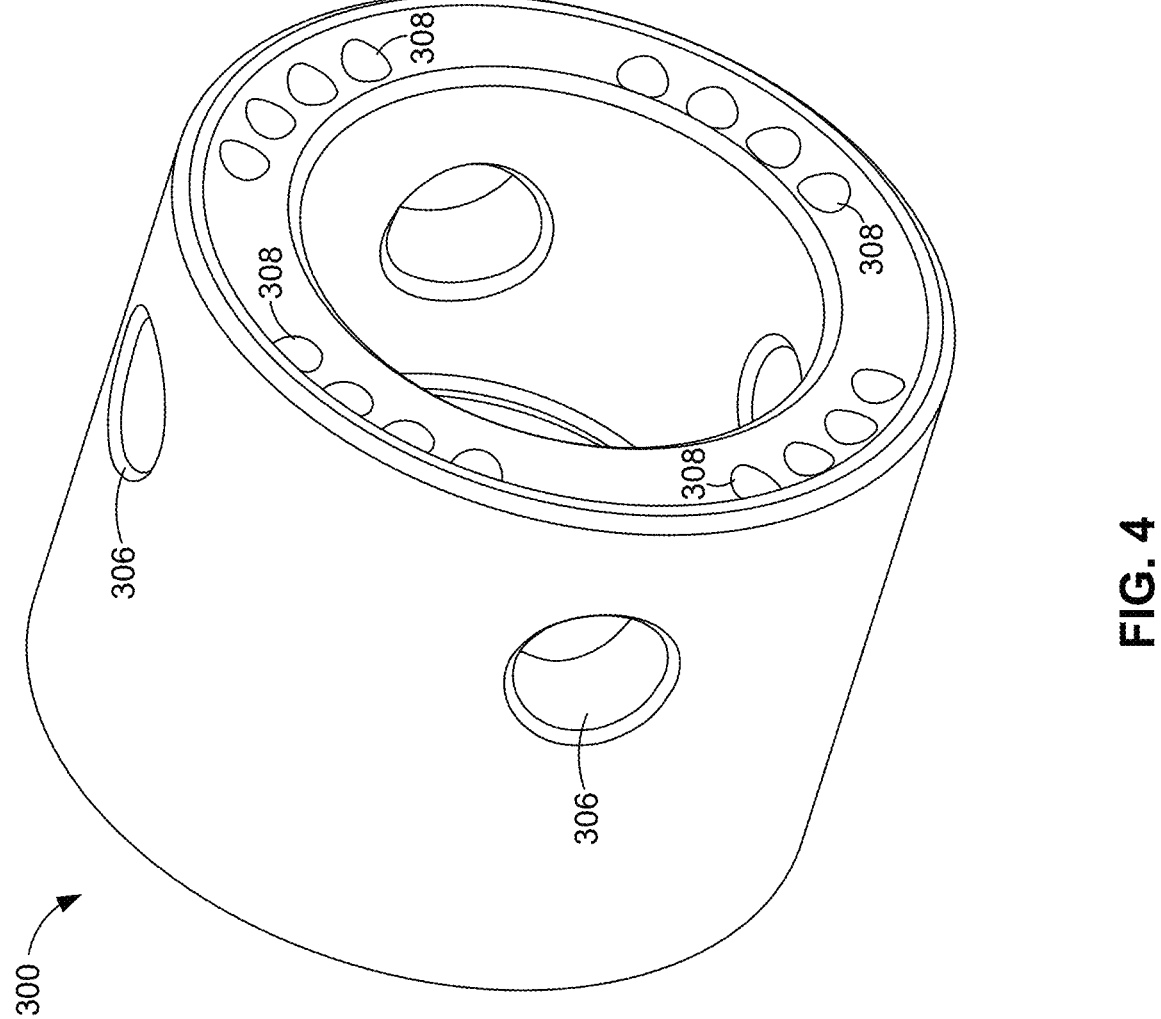
FIG. 4 is a perspective view of an example valve cartridge sleeve.

FIG. 4 is a perspective view of an example of the valve cartridge sleeve 300. FIG. 4 shows the radial arrangement of the openings 306 around the valve cartridge sleeve 300. FIG. 4 further shows how the passageways 308 extend within the valve cartridge sleeve 300 transverse, and non-intersecting with the openings 306.

As indicated above, FIG. 4 is provided as an example. Other examples may differ from what is described with regard to FIG. 4.

INDUSTRIAL APPLICABILITY

The valve cartridge assembly described herein (e.g., including the valve cartridge 200 and the valve cartridge sleeve 300) may be used with any positive displacement fluid pump (e.g., a reciprocating positive displacement fluid pump). For example, a fluid pump, such as a hydraulic fracturing pump, having a power end and a fluid end may use the valve cartridge assembly in the fluid end. As described herein, a valve assembly of a fluid pump may include various components, such as a valve, a valve seat, a spring, a spring retainer, or the like, and each of these components are subject to wear and/or failure. Generally, for servicing, the valve assembly may be disassembled and removed from the fluid pump, sometimes using specialized equipment, and then reassembled in the fluid pump following servicing. Accordingly, servicing a valve assembly of the fluid pump can be time consuming and inefficient.

The valve cartridge 200 described herein may include both a suction valve assembly 202 and a discharge valve assembly 204 in a unitary part. In particular, the valve cartridge 200 may be inserted into, or removed from, a bore of a fluid pump as a unit. When the valve cartridge 200 is inserted into the fluid pump, the suction valve assembly 202 and the discharge valve assembly 204 are appropriately positioned to provide control over low-pressure fluid entering the fluid pump and high-pressure fluid exiting the fluid pump. Thus, the valve cartridge 200 facilitates plug-and-play installation of the suction valve assembly 202 and the discharge valve assembly 204 in the fluid pump. After a useful life of the suction valve assembly 202 and the discharge valve assembly 204, the valve cartridge 200 may be removed from the fluid pump and replaced with a new valve cartridge 200. Accordingly, the valve cartridge 200 enables fast and efficient servicing of the suction valve assembly 202 and the discharge valve assembly 204.

Moreover, the valve cartridge sleeve 300 provides passageways 308 that facilitate fluid flow through the bore of the fluid pump, outside of the valve cartridge 200, between otherwise isolated chambers of the valve cartridge 200 to achieve proper functioning of the valve cartridge 200. Thus, the valve cartridge sleeve 300 eliminates the need to include such passageways in a fluid end block of the fluid pump. In this way, wear caused by high applied pressures in the fluid pump is experienced by the valve cartridge sleeve 300 rather than the fluid end block, thereby extending a useful life of the fluid end block. After a useful life of the valve cartridge sleeve 300, the valve cartridge sleeve 300 may be removed from the fluid pump and replaced with a new valve cartridge sleeve 300, which is simpler and more efficient than repairing or replacing of the fluid end block.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A fluid end of a fluid pump, comprising:
   a fluid end block with a bore in which a plunger is to reciprocate;
   a valve cartridge, disposed in the bore and configured for insertion into and removal from the bore as a unit, comprising:
      a valve cartridge housing defining:
         a suction chamber that is open at a first end of the valve cartridge housing, and one or more first passageways through the valve cartridge housing that lead into the suction chamber, and
         a discharge chamber that is open at a second end of the valve cartridge housing, and one or more second passageways through the valve cartridge housing that lead into the discharge chamber;
      a suction valve assembly comprising a suction valve that seals the suction chamber, wherein the suction valve assembly is configured to control flow through the suction chamber; and
      a discharge valve assembly comprising a discharge valve that seals the discharge chamber, wherein the discharge valve assembly is configured to control flow through the discharge chamber; and
   a valve cartridge sleeve, disposed in the bore around the valve cartridge housing, that fluidly connects the suction chamber and the discharge chamber.

2. The fluid end of claim 1, wherein the suction valve assembly is configured to open the suction valve toward the plunger, and the discharge valve assembly is configured to open the discharge valve away from the plunger.

3. The fluid end of claim 1, wherein the suction valve assembly is configured to open the suction valve in a first direction away from the valve cartridge housing, and the discharge valve assembly is configured to open the discharge valve in a second direction away from the valve cartridge housing opposite the first direction.

4. The fluid end of claim 1, wherein the suction valve assembly is configured to open the suction valve during a suction stroke of the plunger to cause fluid to flow through the suction chamber into the bore.

5. The fluid end of claim 1, wherein the discharge valve assembly is configured to open the discharge valve during a discharge stroke of the plunger to cause fluid to flow from the bore through the discharge chamber via the valve cartridge sleeve.

6. The fluid end of claim 1, wherein one or more openings extend through the valve cartridge sleeve to an interior cavity of the valve cartridge sleeve, and wherein the one or more openings align with the one or more first passageways.

7. The fluid end of claim 6, wherein one or more passageways extend longitudinally within the valve cartridge sleeve transverse to the one or more openings, and wherein the valve cartridge sleeve fluidly connects the suction chamber and the discharge chamber via the one or more passageways.

8. The fluid end of claim 7, wherein the one or more passageways lead into an inner circumferential groove in the valve cartridge sleeve, and wherein the inner circumferential groove aligns with the one or more second passageways.

9. The fluid end of claim 1, wherein the discharge chamber is fluidly isolated from the suction chamber through the valve cartridge housing.

10. A valve cartridge assembly, comprising:

a valve cartridge housing defining:

a suction chamber that is open at a first end of the valve cartridge housing, and one or more first passageways through the valve cartridge housing that lead into the suction chamber, and a discharge chamber that is open at a second end of the valve cartridge housing, and one or more second passageways through the valve cartridge housing that lead into the discharge chamber, wherein the discharge chamber is fluidly isolated from the suction chamber through the valve cartridge housing, wherein openings into the one or more second passageways are nearer to the second end of the valve cartridge housing than openings into the one or more first passageways, and wherein the openings into the one or more first passageways and the openings into the one or more second passageways are on a radially outer surface of the valve cartridge housing;

a suction valve assembly comprising a suction valve that seals the suction chamber, wherein the suction valve assembly is configured to control flow through the suction chamber; and a discharge valve assembly comprising a discharge valve that seals the discharge chamber, wherein the discharge valve assembly is configured to control flow through the discharge chamber.

11. The valve cartridge assembly of claim 10, further comprising a valve cartridge sleeve around the valve cartridge housing, wherein the valve cartridge sleeve fluidly connects the suction chamber and the discharge chamber.

12. The valve cartridge assembly of claim 11, wherein one or more openings extend through the valve cartridge sleeve to an interior cavity of the valve cartridge sleeve.

13. The valve cartridge assembly of claim 12, wherein one or more passageways extend longitudinally within the valve cartridge sleeve transverse to the one or more openings, and wherein the valve cartridge sleeve fluidly connects the suction chamber and the discharge chamber via the one or more passageways.

14. The valve cartridge assembly of claim 10, wherein the suction valve assembly is configured to open the suction valve in a first direction away from the valve cartridge housing, and the discharge valve assembly is configured to open the discharge valve in a second direction away from the valve cartridge housing opposite the first direction.

15. The valve cartridge assembly of claim 10, wherein the one or more first passageways comprise multiple first passageways arranged radially around the valve cartridge housing, and wherein the one or more second passageways comprise multiple second passageways arranged radially around the valve cartridge housing.

16. The valve cartridge assembly of claim 10, further comprising:

multiple sealing rings arranged in the valve cartridge housing to be on opposite sides of the one or more first passageways and opposite sides of the one or more second passageways.

17. A fluid pump, comprising:

a power end; and a fluid end, coupled to the power end, comprising:

a fluid end block with a bore, and a plunger configured to reciprocate with respect to the bore;

a valve cartridge, configured for insertion into and removal from the bore as a unit, comprising:

a valve cartridge housing defining:

a suction chamber that is open at a first end of the valve cartridge housing, and one or more first passageways through the valve cartridge housing that lead into the suction chamber, and a discharge chamber that is open at a second end of the valve cartridge housing, and one or more second passageways through the valve cartridge housing that lead into the discharge chamber, wherein openings into the one or more second passageways are nearer to the second end of the valve cartridge housing than openings into the one or more first passageways, and wherein the openings into the one or more first passageways and the openings into the one or more second passageways are on a radially outer surface of the valve cartridge housing;

a suction valve assembly comprising a suction valve that seals the suction chamber, wherein the suction valve assembly is configured to control flow through the suction chamber; and a discharge valve assembly comprising a discharge valve that seals the discharge chamber, wherein the discharge valve assembly is configured to control flow through the discharge chamber.

18. The fluid pump of claim 17, wherein the suction valve assembly is configured to open the suction valve in a first direction away from the valve cartridge housing, and the discharge valve assembly is configured to open the discharge valve in a second direction away from the valve cartridge housing opposite the first direction.

19. The fluid pump of claim 17, wherein the discharge chamber is fluidly isolated from the suction chamber through the valve cartridge housing.

20. The fluid pump of claim 19 further comprising a valve cartridge sleeve around the valve cartridge housing, wherein the valve cartridge sleeve fluidly connects the suction chamber and the discharge chamber.

* * * * *